(12) United States Patent
Hong et al.

(10) Patent No.: US 9,329,878 B2
(45) Date of Patent: May 3, 2016

(54) APPARATUS AND METHOD FOR PROVIDING VIRTUAL API FOR MASHUP SERVICE

(71) Applicant: Electronics and Telecommunications Research Institute, Daejeon (KR)

(72) Inventors: Kang-Woon Hong, Daejeon (KR); Won Ryu, Seoul (KR); Il-Gu Jung, Daejeon (KR)

(73) Assignee: ELECTRONICS AND TELECOMMUNICATIONS RESEARCH INSTIT, Daejeon (KR)

( * ) Notice: Subject to any disclaimer, the term of this patent is extended or adjusted under 35 U.S.C. 154(b) by 0 days.

(21) Appl. No.: 14/332,584

(22) Filed: Jul. 16, 2014

(65) Prior Publication Data

US 2015/0212865 A1    Jul. 30, 2015

(30) Foreign Application Priority Data

Jan. 27, 2014    (KR) .................... 10-2014-0009760

(51) Int. Cl.
| | | |
|---|---|---|
| *G06F 3/00* | (2006.01) | |
| *G06F 3/048* | (2013.01) | |
| *G06F 9/455* | (2006.01) | |
| *G06F 9/54* | (2006.01) | |

(Continued)

(52) U.S. Cl.
CPC ............... *G06F 9/455* (2013.01); *G06F 3/048* (2013.01); *G06F 9/54* (2013.01); *G06F 17/30893* (2013.01); *H04L 67/02* (2013.01)

(58) Field of Classification Search
CPC ................................. G06F 9/54; G06F 3/048

USPC .................................................. 719/328, 764
See application file for complete search history.

(56) References Cited

U.S. PATENT DOCUMENTS

| 8,433,747 | B2 | 4/2013 | Qiu et al. | |
|---|---|---|---|---|
| 2011/0010612 | A1* | 1/2011 | Thorpe | G06F 17/30899 |
| | | | | 715/234 |

(Continued)

FOREIGN PATENT DOCUMENTS

| KR | 2004030009 | * | 4/2004 |
|---|---|---|---|
| KR | 1020090017942 A | | 2/2009 |
| KR | 1020090127158 A | | 12/2009 |

(Continued)

OTHER PUBLICATIONS

Eyal, ActiveRDF:object-oriented RDF in Ryby, 2006.*

(Continued)

*Primary Examiner* — Lechi Truong
(74) *Attorney, Agent, or Firm* — William Park & Associates Ltd.

(57) ABSTRACT

The present invention relates to an apparatus and a method for providing a virtual API for a web-application mashup service. The apparatus for providing a virtual API includes: a screen data obtaining unit configured to obtain a website screen by accessing a website based on website access information or obtain an application program execution result screen by executing an application program based on application program execution information; and a virtual API processing unit configured to capture an interested area from the website screen related to a virtual API called by a client or from the application program execution result screen and provide the captured predetermined area of interest to the client.

10 Claims, 7 Drawing Sheets

(51) Int. Cl.
*H04L 29/08* (2006.01)
*G06F 17/30* (2006.01)

(56) References Cited

U.S. PATENT DOCUMENTS

2011/0153590 A1 6/2011 Chang et al.
2012/0278718 A1* 11/2012 Esaka ............... G06F 17/30899
715/719

FOREIGN PATENT DOCUMENTS

KR 1020110070069 A 6/2011
KR 1020110070724 A 6/2011

OTHER PUBLICATIONS

Yan Lu, Virtualized Sceen: A Third Element for Cloud—Mobile Convergence, 2011.*

* cited by examiner

APPARATUS AND METHOD FOR PROVIDING VIRTUAL API FOR MASHUP SERVICE

CROSS-REFERENCE TO RELATED APPLICATIONS

This application claims the benefit of Korean Patent Application No. 10-2014-0009760, filed with the Korean Intellectual Property Office on Jan. 27, 2014, the disclosure of which is incorporated herein by reference in its entirety.

BACKGROUND

1. Technical Field

Exemplary embodiments broadly relate to an apparatus and a method for providing a virtual API for a web-applicable mashup service, more specifically to an apparatus and a method for providing functions that are not provided through an open API, which is provided by a web server, by having these functions implemented in a virtual API.

2. Background Art

Mashup refers to creating new software, service, database, etc. by combining open application programming interfaces (API) provided in the web.

However, the information (e.g., data, content, service) provided through the open API may have limits or may not contain required information.

Accordingly, a new method is needed to obtain required information regardless of provision of relevant API by the website in order to develop various, creative mashup services. Moreover, in order to provide user-friendly information, the obtainable information should be what the users want and find valuable, rather than what the providers want to disclose, and non-web-based application programs should be also utilizable in the mashup services.

SUMMARY

Exemplary embodiments are developed to resolve the disadvantages associated with the related-art technologies. Exemplary embodiments provide an apparatus and a method for providing at least some of the functions that are not provided in an open API form in the web and/or some of the functions of application programs in the form of a virtual API.

Illustrative, non-limiting embodiments may overcome the above disadvantages and other disadvantages not described above. The present invention is not necessarily required to overcome any of the disadvantages described above, and the illustrative, non-limiting embodiments may not overcome any of the problems described above. The appended claims should be consulted to ascertain the true scope of the invention.

According to an aspect of exemplary embodiments, there is provided an apparatus for providing a virtual API. The apparatus for providing a virtual API in accordance with an embodiment of the present invention can include: a screen data obtaining unit configured to obtain a website screen by accessing a website based on website access information or obtain an application program execution result screen by executing an application program based on application program execution information; and a virtual API processing unit configured to capture an interested area from the website screen related to a virtual API called by a client or from the application program execution result screen and provide the captured predetermined area of interest to the client.

According to an exemplary embodiment, the screen data obtaining unit can include access/execution information DB having the website access information and the application program execution information stored therein.

According to an exemplary embodiment, the website access information stored in the access/execution information DB can include at least one of web browser size information, access URL information, log-in information and menu selection procedure information provided by the website, and the website access information stored in the access/execution information DB is for a website that does not support an open API.

According to an exemplary embodiment, the application program execution information stored in the access/execution information DB can include program screen size information and program execution commands.

According to an exemplary embodiment, the virtual API processing unit can include: interested area information DB configured to store interested area information in the website screen or the application program execution result screen; virtual API DB configured to store virtual API information corresponding to the interested area; and a virtual API daemon configured to provide the virtual API information stored in the virtual API DB to the client, and, when a virtual API call command is received from the client, to capture and encode an interested area corresponding to the called virtual API from the website screen or application program result screen associated with the virtual API, and to provide the captured and encoded interested area to the client.

According to an exemplary embodiment, the interested area information can be inputted by a user.

According to an exemplary embodiment, the interested area information can include at least one of target website or application program screen information, initial position, height and width of an interested area, and area capture information.

According to an exemplary embodiment, the virtual API information can include virtual API name and virtual API factor.

According to yet another aspect of an exemplary embodiment, there is provided a method for providing a virtual API. The method for providing a virtual API can include: storing website access information and application program execution information; obtaining at least one of website screen and an application program execution result screen, when a virtual API is called by a client, by accessing a website associated with the virtual API based on the stored website access information or executing an application program associated with the virtual API based on the stored application program execution information; and capturing an interested area corresponding to the virtual API from the website screen or the application program execution result screen and providing the captured interested area to the client.

According to an exemplary embodiment, the method can further include: receiving and storing interested area information in a website screen and the application program execution result screen; generating and storing virtual API information corresponding to the interested area; and providing the stored virtual API information to a client.

According to an exemplary embodiment, the interested area information is received from a user.

According to yet another aspect of an exemplary embodiment, there is provided a computing device including a processor and a memory, which includes instructions, when executed by the processor, perform operations including: storing website access information and application program execution information; obtaining at least one of a website screen and an application program execution result screen, when a virtual API is called by a client, by accessing a website associated with the virtual API based on the stored website access information or executing an application program associated with the virtual API based on the stored application program execution information; and capturing an interested area corresponding to the virtual API from the website screen or the application program execution result screen and providing the captured interested area to the client.

Moreover, the operations can include: receiving and storing interested area information in a website screen and the application program execution result screen; generating and storing virtual API information corresponding to the interested area; and providing the stored virtual API information to a client.

The present invention can be utilized for developing a variety of creative mashup services for allowing users to utilize valuable information. Moreover, the present invention allows for enhanced utilization of information by virtualizing a web and an application in the form of an API, in order to utilize the information that has not been accessible through open APIs.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Throughout the description of the present invention, when describing a certain relevant conventional technology is determined to evade the point of the present invention, the pertinent detailed description will be omitted.

Unless otherwise stated, any expression in singular form in the description and the claims shall be interpreted to generally mean "one or more."

Moreover, any terms "module," "unit," "interface," etc. used in the description shall generally mean computer-related objects and can mean, for example, hardware, software and a combination thereof.

Figure 1:
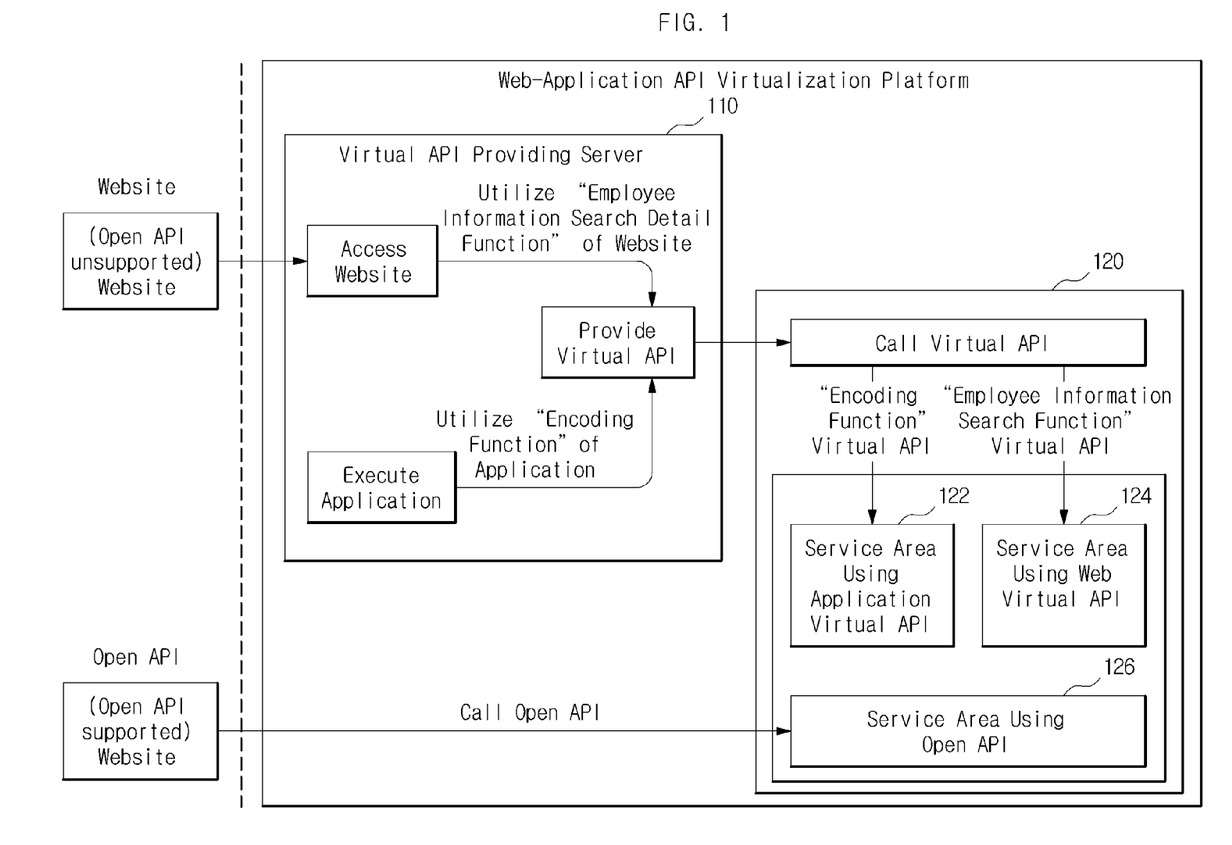
FIG. 1 is a brief illustration of a web-application API virtualization platform in accordance with an embodiment of the present invention.

FIG. 1 is a brief illustration of a web-application API virtualization platform in accordance with an embodiment of the present invention.

As illustrated, a web-application API virtualization platform can include a virtual API providing server 110, which provides a virtual API, and a client 120, which calls the virtual API.

In order to virtualize functions that are not supported with open API to API and provide the virtualized API to users, the virtual API providing server 110 can obtain a screen having user-required functions included therein and provide the screen in the form of virtual API to the users, by accessing a website or running an application program. For example, the virtual API providing server 110 can access corporate groupware not exposed to outside sites on a web browser, run a video transcoder program, or produce a virtual API form of a partial function (e.g., searching employee information) of the groupware that is not provided in an open API form or of an encoding function of the application program, and can provide the virtual API form to the client 120.

The client 120 can call the virtual API and display results of the virtual API on a selected screen area. As illustrated in FIG. 1, the client 120 can display a screen that includes a service area using a web virtual API and a service area using an application virtual API, and also can display results of calling a conventional open API in a screen of a service area using an open API.

Figure 2:
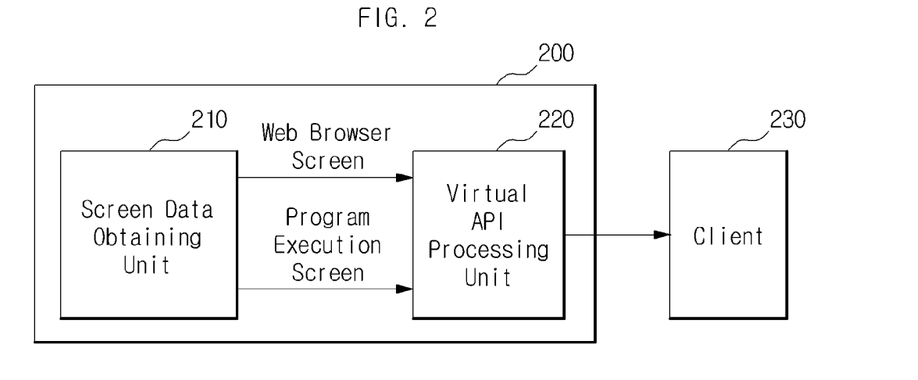
FIG. 2 is a block diagram illustrating the configuration of an apparatus for providing a virtual API in accordance with an embodiment of the present invention.

FIG. 2 is a block diagram illustrating the configuration of an apparatus for providing a virtual API in accordance with an embodiment of the present invention.

As shown in FIG. 2, an apparatus for providing a virtual API 200 in accordance with an embodiment of the present invention can include a screen data obtaining unit 210 and a virtual API processing unit 220.

In one embodiment, the screen data obtaining unit 210 can obtain a website screen by accessing a website based on website access information or obtain an application program execution result screen by running an application program based on application program execution information.

The virtual API processing unit 220 can capture an interested area from the website screen related to the virtual API called by the client or from the application program execution result screen and provide the captured predetermined area of interest to a relevant client.

Hereinafter, the screen data obtaining unit 210 and the virtual API processing unit 220 will be described in more detail with reference to FIGS. 3 and 4.

Figure 3:
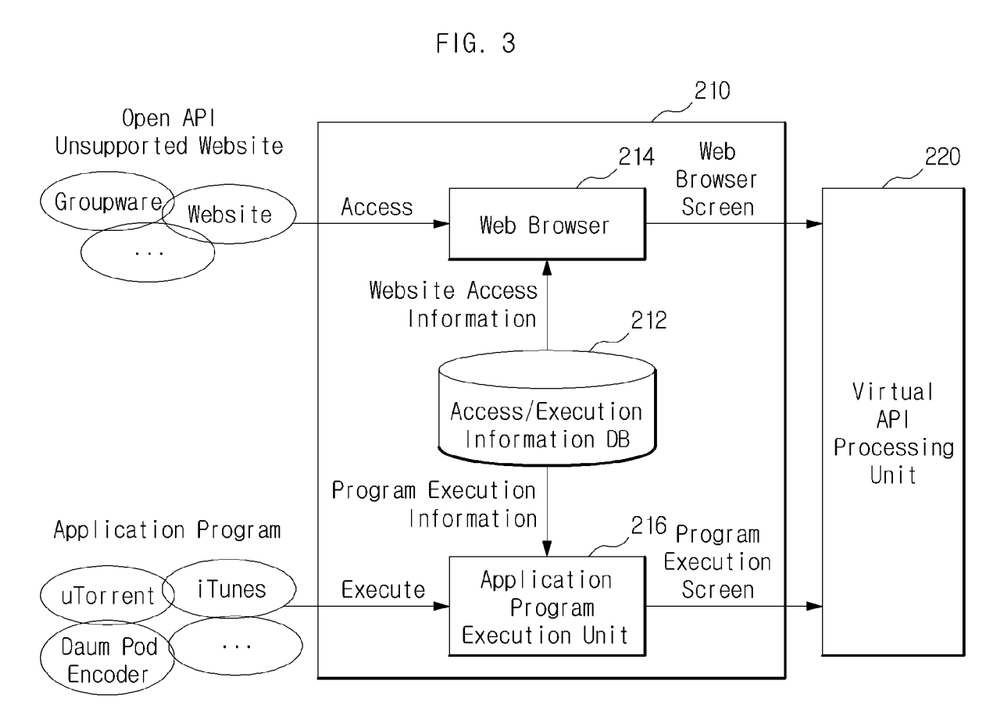
FIG. 3 is a block diagram illustrating the detailed configuration of a screen data obtaining unit included in the apparatus for providing a virtual API in accordance with an embodiment of the present invention.

FIG. 3 is a block diagram illustrating the detailed configuration of the screen data obtaining unit 210 included in the apparatus for providing a virtual API in accordance with an embodiment of the present invention.

As shown in FIG. 3, the screen data obtaining unit 210 includes access/execution information DB 212, a web browser 214 and an application program execution unit 216.

The access/execution information DB 212 has website access information and application program execution information stored therein.

In one embodiment, the website access information and application program execution information stored in the access/execution information DB 212 can be inputted from outside, for example, from a user or administrator.

In one embodiment, the website access information may include at least one of web browser size information, access URL information, log-in information and menu selection procedure information provided by the website, and the website to be accessed that has the access information thereof stored in the access/execution information DB 212 does not support open API.

In one embodiment, the application program execution information may include program screen size information and program execution commands.

The web browser 214 can use the website access information stored in the access/execution information DB 212 to access a website and obtain the website screen thereof. For example, in the case where a partial function of groupware is made to an API, an employee information search menu screen can be obtained by accessing the groupware using web browser size information, groupware access URL information, groupware log-in information and employee information search menu selection procedure information, which are stored in the access/execution information DB 212.

The application program execution unit 216 can obtain the application program execution result screen by running an application program by use of the application program execution information stored in the access/execution information DB 212.

Figure 4:
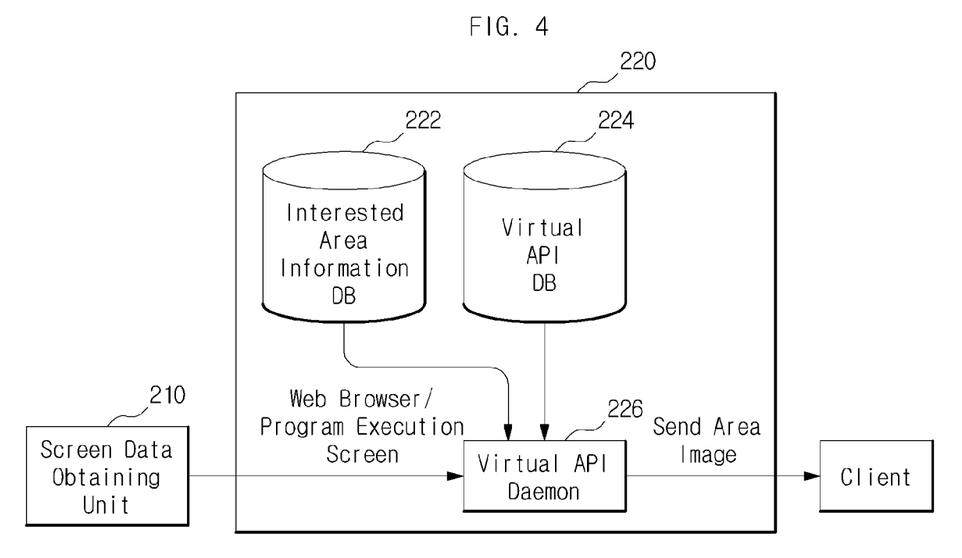
FIG. 4 is a block diagram illustrating the detailed configuration of a virtual API processing unit included in the apparatus for providing a virtual API in accordance with an embodiment of the present invention.

FIG. 4 is a block diagram illustrating the detailed configuration of the virtual API processing unit 220 included in the apparatus for providing a virtual API in accordance with an embodiment of the present invention.

As shown in FIG. 4, the virtual API processing unit 220 can include interested area information DB 222, virtual API DB 224 and virtual API daemon 226.

The interested area information DB 222 has interested area information in the website screen and the application program execution result screen stored therein.

In one embodiment, the interested area information can be determined through an input from outside, for example, an input by the administrator or user.

In one embodiment, the interested area information can include at least one of target website or application program screen information, initial position, height and width of an interested area, and area capture information (e.g., sampling rate).

Once the interested area information is inputted, a virtual API corresponding to the inputted interested area information is created and stored in the virtual API DB 224.

The virtual API DB 224 is where virtual API information corresponding to the interested area is stored, and can include virtual API name and virtual API factor information.

The virtual API daemon 226 can provide the virtual API information stored in the virtual API DB 224 to the client, refer to the interested area information DB 222 once a virtual API call command is received from the client, capture and encode an interested area corresponding to the called virtual API from the website screen or application program result screen related to the virtual API, and provide the captured and encoded interested area to the client.

For example, in case where employee search function of groupware is to be provided as a virtual API, a user inputs information on the interested area where employee information is displayed when the groupware is accessed through the web browser. The information on the interested area is then stored in the interested area DB 222 and an employee information search virtual API (API name: search employee; API factor: ID/name, etc.) is created and the created employee information search virtual API is registered in the virtual API DB 224. Once the newly registered virtual API is registered, the virtual API daemon 226 can receive the virtual API call request. Once the virtual API call request for employee information search is received from the client, the virtual API daemon 226 will capture and encode an employee information area from the web browser screen associated with the pertinent menu and transfer the captured and encoded employee information area to the client.

Figure 5:
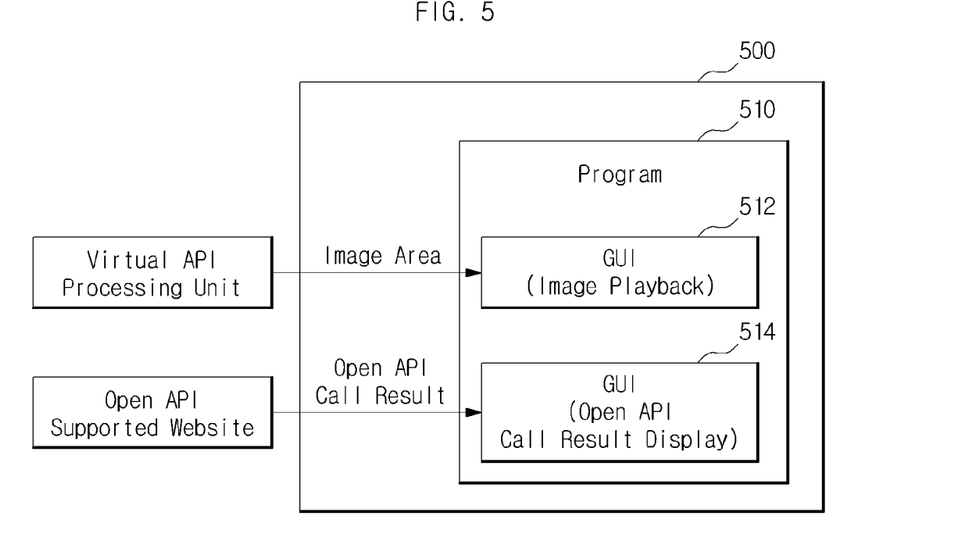
FIG. 5 illustrates a client that calls the virtual API in accordance with an embodiment of the present invention.

FIG. 5 illustrates a client that calls the virtual API in accordance with an embodiment of the present invention.

As illustrated, it is assumed that a program 510 using open APIs and virtual APIs are run on a client. For instance, in the case where the program 510 has to search additional information using employee information, the program 510 calls the virtual API for searching employee information, receives a screen providing the employee information as a result of calling the API, displays it in a screen area 512, calls an open API using the employee information as a factor thereof, and receives and displays the result in a screen area 514.

Figure 6:
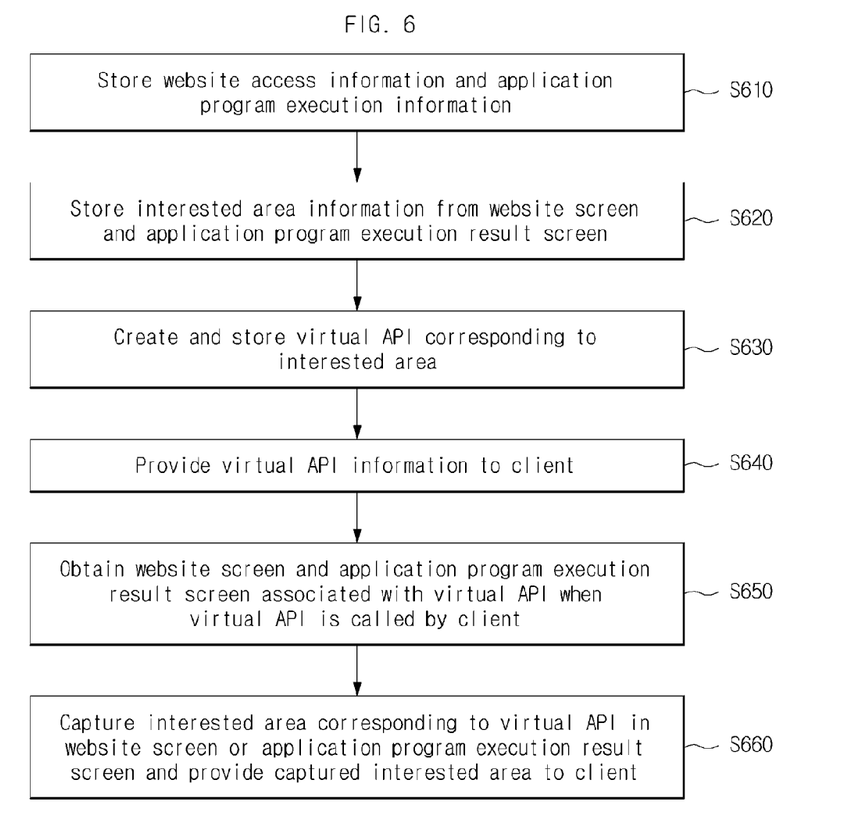
FIG. 6 is a flow diagram illustrating a method for providing a virtual API in accordance with an embodiment of the present invention.

FIG. 6 is a flow diagram illustrating a method for providing a virtual API in accordance with an embodiment of the present invention.

In step S610, website access information and application program execution information are stored in access/execution information DB.

In one embodiment, the website access information includes at least one of web browser size information, access URL information, log-in information and menu selection procedure information provided by the website. Here, the website access information to be stored in the access/execution information DB is for a website that does not support open API.

In one embodiment, the application program execution information may include program screen size information and program execution commands.

In step S620, interested area information in a website screen and an application program execution result screen is received and stored in interested area DB.

In one embodiment, the interested area information can include at least one of target website or application program screen information, initial position, height and width of an interested area, and area capture information (e.g., sampling rate).

In step S630, virtual API information corresponding to the interested area is created and registered and stored in virtual API DB.

In one embodiment, the virtual API information can include virtual API name and virtual API factor information.

In step S640, the virtual API information stored in the virtual API DB is provided to a client.

In step 650, when the virtual API is called by the client, the website screen and the application program execution result screen are obtained by accessing a website associated with the virtual API based on the stored website access information or executing an application program associated with the virtual API based on the stored application program execution information.

In step S660, an interested area corresponding to the virtual API can be captured in the website screen or the application program execution result screen and provided to the client.

The above-described steps for the method for providing a virtual API in accordance with an embodiment of the present invention are not necessarily restricted to the order described herein, and it shall be appreciated by those of ordinary skill in the art that the order of the steps can be varied depending on the embodiment. For example, although it is described in the present embodiment that the website and application program screens are obtained after the virtual API is called by the client, there can be other embodiments in which the screens are obtained before the virtual API is called and then the interested area corresponding to the virtual API is captured after the virtual API is called.

Figure 7:
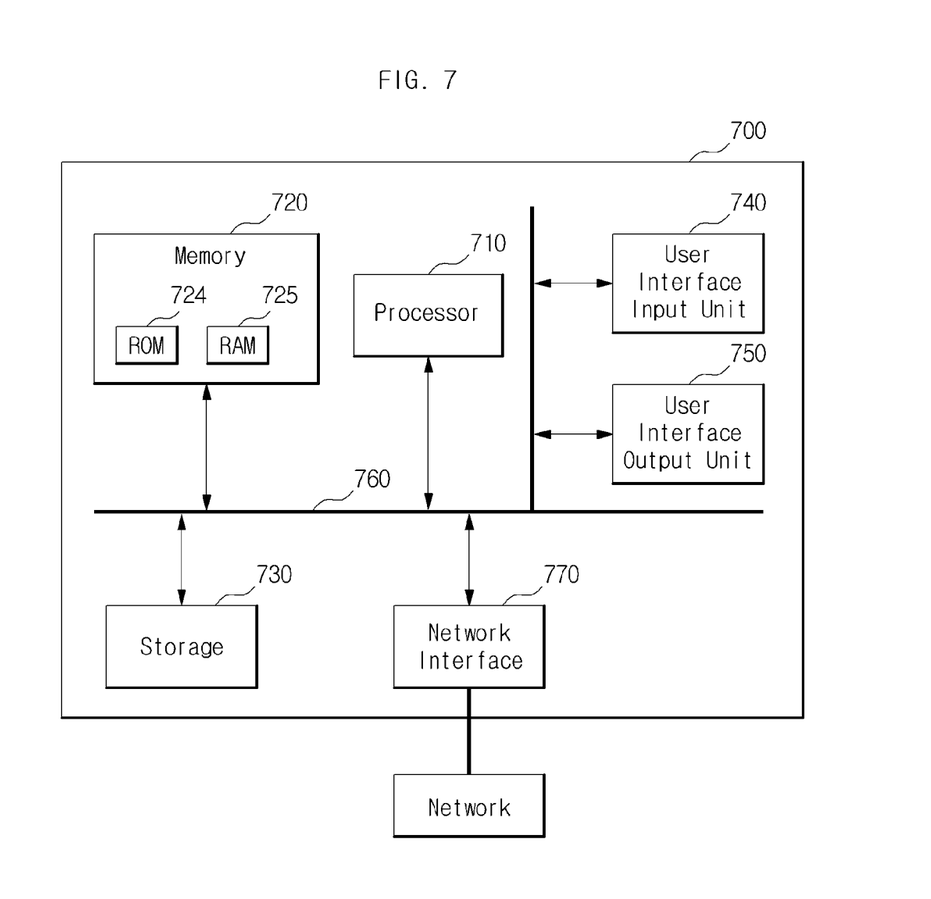
FIG. 7 is a block diagram illustrating the configuration of a computing system for implementing the apparatus for providing a virtual API in accordance with the present invention.

FIG. 7 is a block diagram illustrating the configuration of a computing system for implementing the apparatus/method for providing a virtual API in accordance with the present invention. Embodiments according to the present invention can be implemented in a computer system, for example, as a computer readable medium.

As shown in FIG. 7, a computer system 700 may include one or more of a processor 710, a memory 720, a storage 730, a user interface input unit 740, and a user interface output unit 750, each of which communicates through a bus 760. The computer system 700 may also include a network interface 770 that is coupled to a network. The processor 710 may be a central processing unit (CPU) or a semiconductor device that executes processing instructions stored in the memory 720 and/or the storage 730. The memory 720 and the storage 730 may include various forms of volatile or non-volatile storage media. For example, the memory may include a read-only memory (ROM) 724 and a random access memory (RAM) 725.

Accordingly, an embodiment of the invention may be implemented as a computer implemented method or as a non-transitory computer readable medium with computer executable instructions stored thereon. In one embodiment, when executed by the processor, the computer readable instructions may perform a method according to at least one aspect of the invention.

The program instructions stored in the computer readable medium can be designed and configured specifically for the present invention or can be publically known and available to those who are skilled in the field of software. Examples of the computer readable medium can include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Moreover, the above-described media can be transmission media, such as optical or metal lines and a waveguide, which include a carrier wave that transmits a signal designating program instructions, data structures, etc. Examples of the program instructions can include machine codes made by, for example, a compiler, as well as high-language codes that can be executed by an electronic data processing device, for example, a computer, by using an interpreter.

The above hardware devices can be configured to operate as one or more software modules in order to perform the operation of the present invention, and the opposite is also possible.

Hitherto, certain embodiments of the present invention have been described, and it shall be appreciated that a large number of permutations and modifications of the present invention are possible without departing from the intrinsic features of the present invention by those who are ordinarily skilled in the art to which the present invention pertains. Accordingly, the disclosed embodiments of the present invention shall be appreciated in illustrative perspectives, rather than in restrictive perspectives, and the scope of the technical ideas of the present invention shall not be restricted by the disclosed embodiments. The scope of protection of the present invention shall be interpreted through the claims appended below, and any and all equivalent technical ideas shall be interpreted to be included in the claims of the present invention.

What is claimed is:

1. A computer program product for providing a virtual application programming interface (API), the computer program product comprising:

a non-transitory computer readable storage medium having computer executable program code embodied therewith, the computer executable program code comprising:

computer executable program code that obtains a website screen by accessing a website based on website access information or that obtains an application program execution result screen by executing an application program based on application program execution information; and computer executable program code that captures an interested area according to interested area information from the website screen related to a virtual API called by a client or from the application program execution result screen and provides the captured predetermined area of interest to the client, computer executable program code that stores interested area information related to virtual API name and virtual API factor information of the virtual API;

wherein the computer executable program code that obtains a website screen or an application program execution result screen unit comprises an access/execution information database (DB) having the website access information and the application program execution information stored therein;

wherein the website access information comprises at least one of web browser size information, access URL information, log-in information and menu selection procedure information provided by the website, and wherein the website access information stored in the access/execution information DB is for a website that does not support an open API.

2. The computer program product of claim 1, wherein the application program execution information stored in the access/execution information DB comprises program screen size information and program execution commands.

3. The computer program product of claim 1, wherein the computer executable program code that captures an interested area comprises:

interested area information DB that stores interested area information in the website screen or the application program execution result screen;

virtual API DB that stores virtual API information corresponding to the interested area; and a virtual API daemon that provides the virtual API information stored in the virtual API DB to the client, and, when a corresponding virtual API call command is received from the client, captures and encodes an interested area corresponding to the called virtual API from the website screen or application program result screen associated with the virtual API, and provides the captured and encoded interested area to the client.

4. The computer program product of claim 3, wherein the interested area information is inputted by a user.

5. The computer program product of claim 3, wherein the interested area information comprises at least one of target website or application program screen information, initial position, height and width of an interested area, and area capture information.

6. A method for providing a virtual application programming interface (API), comprising:

storing website access information and application program execution information; storing interested area information related to virtual API name and virtual API factor information of a virtual API;

obtaining at least one of web site screen and an application program execution result screen, when the virtual API is called by a client, by accessing a website associated with the virtual API based on the stored website access information or executing an application program associated with the virtual API based on the stored application program execution information; and capturing an interested area according to interested area information corresponding to the virtual API from the website screen or the application program execution result screen and providing the captured interested area to the client;

wherein the computer executable program code that obtains a website screen or an application program execution result screen unit comprises an access/execution information database (DB) having the website access information and the application program execution information stored therein;

wherein the website access information comprises at least one of web browser size information, access URL information, log-in information and menu selection procedure information provided by the website, and wherein the website access information stored in the access/execution information DB is for a website that does not support an open API.

7. The method of claim 6, further comprising:

receiving and storing interested area information in a website screen and the application program execution result screen;

generating and storing virtual API information corresponding to the interested area; and providing the stored virtual API information to a client.

8. The method of claim 7, wherein the interested area information is received from a user.

9. A computing device, comprising:

a processor; and a memory comprising instructions that, when executed by the processor, perform operations comprising:

storing website access information and application program execution information;

storing interested area information related to virtual API name and virtual API factor information of a virtual API, obtaining at least one of a website screen and an application program execution result screen, when a virtual application programming interface (API) is called by a client, by accessing a website associated with the virtual API based on the stored website access information or executing an application program associated with the virtual API based on the stored application program execution information; and capturing an interested area according to interested are information corresponding to the virtual API from the website screen or the application program execution result screen and providing the captured interested area to the client;

wherein the computer executable program code that obtains a website screen or an application program execution result screen unit comprises an access/execution information database (DB) having the website access information and the application program execution information stored therein;

wherein the website access information comprises at least one of web browser size information, access URL information, log-in information and menu selection procedure information provided by the website, and wherein the website access information stored in the access/execution information DB is for a website that does not support an open API.

10. The computing device of claim 9, wherein the operations further comprises:

receiving and storing interested area information in a website screen and the application program execution result screen;

generating and storing virtual API information corresponding to the interested area; and providing the stored virtual API information to a client.

\* \* \* \* \*